March 20, 1962  C. B. JACKSON ET AL  3,026,364
THERMALLY REGENERATIVE MANGANATE GALVANIC CELL
Filed Aug. 24, 1959
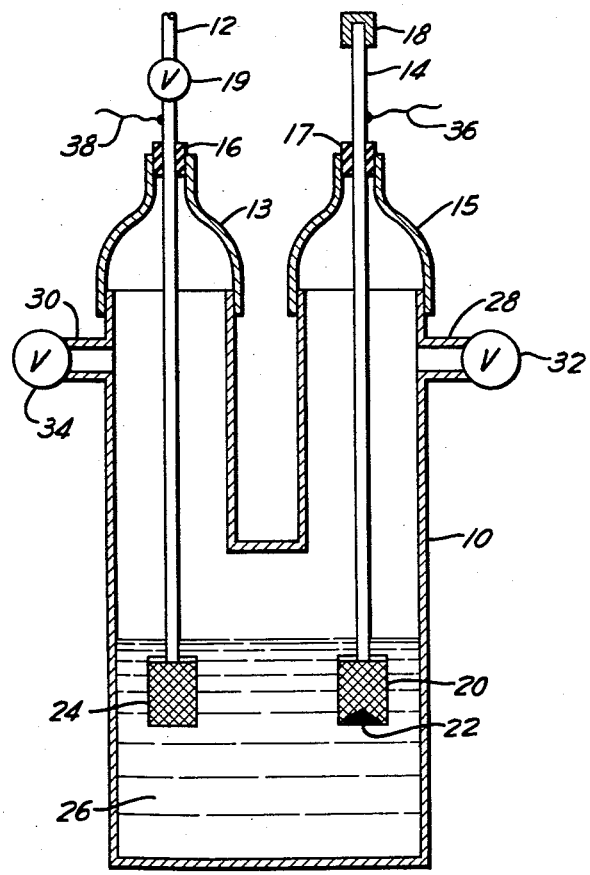
INVENTORS
CAREY B. JACKSON
ROBERT E. SHEARER
BY
Brown, Critchlow, Flick & Peckham
THEIR ATTORNEYS 3,026,364
THERMALLY REGENERATIVE MANGANATE
GALVANIC CELL
Carey B. Jackson, Zelienople, and Robert E. Shearer, Edgewood, Pa., assignors to MSA Research Corporation, a corporation of Pennsylvania
Filed Aug. 24, 1959, Ser. No. 835,659
5 Claims. (Cl. 136—86)

The present invention relates to novel thermally regenerative galvanic cells.

It is among the objects of the present invention to provide new and novel thermally regenerative galvanic cells which produce an E.M.F. upon chemical conversion of manganese dioxide to an alkali metal manganate, which conversion can be reversed by thermal means.

The invention will be described with reference to the accompanying drawing in which the single figure is a view, partly in section and partly in elevation, of one form of cell embodying the discoveries comprising the present invention.

Cells in accordance with the invention comprise an anode of manganese dioxide, an oxygen cathode, and an alkali metal hydroxide solvent. The hydroxide solvent takes part in reaction with the electrodes during cell operation. The electrode reactions occurring in cells of this invention, where sodium hydroxide is the solvent, are postulated as follows:

Anode: $4OH^- + 2Na^+ + MnO_2 - 2e \rightarrow Na_2MnO_4 + 2H_2O$

Cathode: $\frac{1}{2}O_2 + 2Na^+ + H_2O + 2e \rightarrow 2Na^+ + 2OH^-$

The overall reaction is therefore:

Overall: $2Na^+ + 2OH^- + MnO_2 + \frac{1}{2}O_2 \rightarrow Na_2MnO_4 + H_2O$

Referring now to the drawing, the single figure shows a typical cell that is in accordance with this invention. It is composed of a U-shaped vessel 10, constructed of a material capable of withstanding the temperatures involved; stainless steel has been used satisfactorily. Mounted within the vessel 10 are two tubular electrode holders 12 and 14. The electrode holders are insulated from vessel 10 by insulating spacers 16 and 17, respectively. The spacers, in turn, are fitted into openings in the cap members 13 and 15 that fit snugly over and close the open ends of the arms of the U-shaped vessel 10. In the embodiment shown, the electrode holders are stainless steel tubes, but other configurations as well as other materials of construction, such as nickel or Monel, could be used if desired. A removable top 18 is provided that engages the upper end of the anode holder 14 in air-tight fashion. Hence, charges of the anode material may be added as occasion demands simply by removing the cap and pouring the dioxide into tube 14. A valve 19 is placed in the upper end of the cathode holder 12, whereby the cathode gas can be admitted or the tube be sealed off as needed.

At the lower end of the anode electrode holder 14 is attached a stainless steel filter cage 20. The anode in the cells of this invention is manganese dioxide ($MnO_2$), a quantity of which is placed in the cage 20 and is identified by the numeral 22. The manganese dioxide can be a mass thereof or be in particle form; the latter is preferred since reaction is facilitated by a large surface area. The size of the holes in the filter cage 20 is restricted to that which will prevent the $MnO_2$ particles that are used from passing, as such, into the solvent. The cage 20 therefore serves to retain the anode material in place, but also permits the solvent to contact the dioxide. A similar cage 24 is attached to the lower end of the cathode holder 12. This cage 24 serves primarily as a dispersing means for the oxygen at the cathode so that the chemical reaction occurring at the cathode and in which the oxygen takes part can occur rapidly.

An alkali metal hydroxide 26 is placed in the lower end of vessel 10. The amount of hydroxide used is sufficient to cover the filter cage 24 of the cathode, to insure that oxygen entering the cell comes into contact with the solvent. It is also apparent that sufficient hydroxide must be present to contact the anode, manganese dioxide 22, that is contained in the anode filter cage 20. The cell shown is completed by an inlet conduit 28 and an outlet conduit 30 that have valves 32 and 34, respectively, located therein. These valved conduits permit control of the atmosphere within the cell as will be more apparent hereinafter. Electrical leads 36 and 38 are attached, as by soldering, to the metal electrode holders 12 and 14. In use, the external circuit is connected to the cell through those electrical leads.

In operation of one specific embodiment of the invention, a quantity of manganese dioxide is placed in the anode filter cage 20. Sodium hydroxide in an amount that is sufficient to cover the electrodes as above described is placed in the lower end of vessel 10. Nitrogen or another inert gas is flowed through the cell, being admitted through conduit 28 and emerging through conduit 30. With the cathode valve 19 closed, the sodium hydroxide is melted and its temperature raised to about 350° C., as by use of a resistance heater or similar means. The electrical leads are placed in the circuit in which current is to be used. Under these conditions and with the electrolyte maintained at about 350° C., the flow of nitrogen is cut off and simultaneously oxygen is admitted through cathode holder 12 and enters the solvent. At these conditions of temperature and with the oxygen flowing into the solvent, the following chemical reaction occurs:

$2MnO_2 + 4NaOH + O_2 \rightarrow 2H_2O + Na_2MnO_4$ causing a current to flow in the external circuit. When the current is no longer desired, the reaction can be stopped simply by discontinuing the oxygen flow. When that happens, nitrogen suitably is again admitted to the cell to protect it from accidental entry of atmospheric oxygen.

In actual tests, with nitrogen flowing in the cell a spurious voltage was observed developing 140 milliamperes (ma.) of current at 0.015 volt (v.) at the terminal. With oxygen flowing into the hydroxide, a current rise to 194 ma. and a voltage of 0.036 v. were observed. Open circuit voltage was found to be 0.23 v.

As noted above, the reaction is reversible and the reactants can be regenerated. A convenient method of regeneration is practiced by passing high pressure water vapor through the molten solution of sodium manganate in sodium hydroxide. The pressure of the water vapor may be chosen to provide a temperature of about 500° C. when the NaOH is the solvent. Under these conditions the following reaction occurs:

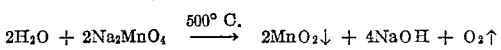

$2H_2O + 2Na_2MnO_4 \xrightarrow{500°\ C.} 2MnO_2\downarrow + 4NaOH + O_2\uparrow$ Regeneration can occur even at room temperature by use of an excess of water; the unused water then is driven off, as by heating, before reactivating the cell.

While regeneration can be practiced in the cell vessel 10, it is preferable to use a separate vessel for that purpose. The molten solution is transferred to that separate vessel. After regeneration has been completed, the resulting suspension of manganese dioxide in sodium hydroxide is fed back to the cell through the anode holder 14. Consequently the manganese dioxide will be filtered from the sodium hydroxide as the latter passes through the filter cage 20, and the cell will simultaneously be prepared for immediate use.

From the foregoing discussion and example, it is apparent that our invention provides a conveniently practiced method and simple apparatus for generation of an electric current under such circumstances that the products of reaction can be treated by thermal means to regenerate the reacting materials. The invention is particularly useful in areas that are isolated and where conventional power sources are unavailable, especially where transportation to such areas is difficult; once the cell components are provided in such an area there is no need for replacement as the reactants can be readily regenerated.

The invention can be carried out otherwise than as specifically exemplified. For example, in place of the sodium hydroxide other alkali metal hydroxides, such as potassium hydroxide, and lithium hydroxide as well as relatively low melting mixtures of alkali metal hydroxides, e.g. eutectics thereof, can be used. Where such other hydroxides are used, the E.M.F. resulting may differ from that in the example. It should also be understood that various relative quantities of manganese dioxide, the electrolyte and oxygen can be used as long as the requisite electrode contact is achieved as described. In regeneration, relatively cool water can be added as such and heat, if needed or desired, be supplied from an external source rather than using high pressure water vapor for that purpose. However the latter is preferred since it assists the reaction that occurs during the regeneration.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. That method of producing electrical current comprising providing a cell containing manganese dioxide as an anode and an alkali metal hydroxide electrolyte solvent, and passing oxygen into said hydroxide while said hydroxide is in the molten state and said manganese dioxide is in contact therewith, whereby the electrochemical reaction $$2MnO_2 + 4MOH + O_2 \rightarrow 2H_2O + 2M_2MnO_4$$

where M is an alkali metal, occurs with the development of an E.M.F.

2. A method in accordance with claim 1 in which said alkali metal is sodium.

3. A thermally regenerative galvanic cell comprising manganese dioxide as an anode, oxygen as a cathode and an alkali metal hydroxide electrolyte.

4. A cell in accordance with claim 3 in which said alkali metal hydroxide is sodium hydroxide.

5. That method of producing electrical current comprising providing a cell containing manganese dioxide as an anode and an alkali metal hydroxide electrolyte-solvent, and passing oxygen into said hydroxide while it is in the molten state and said manganese dioxide is in contact therewith, whereby the electrochemical reaction to $MnO_2 + 4MOH + O_2 \rightarrow 2H_2O + 2M_2MnO_4$, where M is an alkali metal, occurs with the development of an E.M.F., withdrawing the products of reaction, and heating them to an elevated temperature to cause the following reaction to occur:

$$2M_2MnO_4 + 2H_2O \rightarrow 4MOH + O_2\uparrow + MnO_2$$

recovering the resulting oxygen and manganese dioxide and recycling them.

References Cited in the file of this patent

UNITED STATES PATENTS

| | | |
|---|---|---|
| 736,017 | Reid | Aug. 11, 1903 |
| 2,102,701 | Gyuris | Dec. 21, 1937 |